United States Patent [19]
Linder

[11] 3,782,348
[45] Jan. 1, 1974

[54] COMBUSTION ENGINE CONSTRUCTION

[75] Inventor: Ernst Linder, Muhlacker, Germany

[73] Assignee: Robert Bosch GmbH, Stuttgart, Germany

[22] Filed: June 26, 1972

[21] Appl. No.: 266,442

[30] Foreign Application Priority Data
July 28, 1971 Germany.................. P 21 37 694.3

[52] U.S. Cl. .............................. 123/119 A, 60/278
[51] Int. Cl. .......................................... F02m 25/06
[58] Field of Search.................. 123/119 A; 60/278, 60/279

[56] References Cited
UNITED STATES PATENTS
| | | | |
|---|---|---|---|
| 2,889,904 | 6/1959 | Martinoli | 123/119 A X |
| 2,375,883 | 5/1945 | Anderson | 123/119 A |
| 3,491,736 | 1/1970 | Walker | 123/119 A |
| 1,766,669 | 6/1930 | Moore | 123/119 A |

*Primary Examiner*—Al Lawrence Smith
*Assistant Examiner*—William Rutledge, Jr.
*Attorney*—Michael S. Striker

[57] ABSTRACT

An intake conduit in a combustion engine admits a stream of combustion air and has a throttle interposed in it. An exhaust conduit exhausts combustion gases from the engine. A first passage communicates with the intake conduit downstream of the throttle and a second passage communicates with the intake conduit upstream of the throttle. A third passage communicates with the exhaust conduit. A valve is connected with the three passages and movable between one position in which it connects the second and the third passage and another position in which it connects the first and the second passage.

10 Claims, 2 Drawing Figures

COMBUSTION ENGINE CONSTRUCTION

BACKGROUND OF THE INVENTION

The present invention relates generally to a combustion engine, and more particularly to a control arrangement in a combustion engine for controlling the flow of exhaust gas.

It is known to control the emission of carbon monoxide (CO) and of nitrogen oxide (NOx) in the exhaust gases of a combustion engine, by recirculating a portion of the exhaust gases under certain operating conditions of the engine back into the intake manifold of the engine, that is the manifold where the engine takes in fresh combustion air. It is also known to improve the composition of the exhaust gases, that is to reduce the emission of the undesirable components, by admixing supplementary air with the air-fuel mixture, providing bypass conduits which bypass the throttle in the intake conduit and are controlled by suitable valves.

The prior art does not, however, provide any arrangement for reducing the emission of uncombusted or incompletely combusted hydrocarbons (CH) which are equally as undesirable and deleterious as carbon monoxide and nitrogen oxides. The emission of hydrocarbons from combustion engines takes place primarily during shifting of gears, during idling of the engine for warming-up purposes, and when the engine is being turned over by the wheels of the vehicle, that is when for instance the vehicle coasts down an incline.

SUMMARY OF THE INVENTION

It is, accordingly, a general object of the present invention to overcome the disadvantages of the prior art.

More particularly it is an object of the invention to provide, in a combustion engine, an arrangement which avoids these disadvantages.

Still more particularly it is an object of the invention to provide such an arrangement which is capable of reducing not only the emission of carbon monoxide and nitrogen oxides in the exhausted combustion gases of the engine, but also the emission of uncombusted or partially combusted hydrocarbons, especially under critical operating conditions such as when the engine is being turned over by the push of the vehicle, during shifting and during warming-up of the engine.

In pursuance of these objects, and of others which will become apparent hereafter, one feature of the invention resides, briefly stated, in a combustion engine comprising in combination an intake conduit for a stream of combustion air, throttle means interposed in the intake conduit for regulating the flow of combustion air therethrough, and an exhaust conduit for exhausting combustion gases from the engine.

First passage means is provided, communicating with the intake conduit downstream of the throttle means, and second passage means communicates with the intake conduit upstream of the throttle means. Third passage means communicates with the exhaust conduit. Finally, valve means is provided which is connected with the first, second and third passage means and movable between a first position in which it connects the second with the third passage means and a second position in which it connects the first with the second passage means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
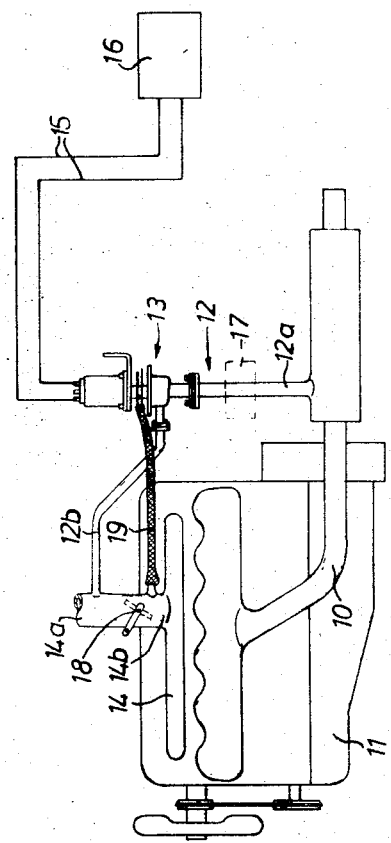
FIG. 1 is a simplified diagrammatic illustration of a combustion engine provided with an arrangement according to the present invention.

Discussing the drawing in detail, and referring firstly to FIG. 1, it will be seen that a combustion engine, such as an internal combustion engine, is diagrammatically illustrated and designated with reference numeral 11. In conventional manner the combustion engine is provided with an exhaust conduit 10 which receives combustion gases being exhausted from the engine 11. Connected with the exhaust conduit 10 is an exhaust recirculating conduit 12 in which there is interposed an electro-magnetically operated valve 13, so that the conduit 12 is subdivided into two conduit portions 12a and 12b each of which constitutes a fluid flow passage. It will be seen that the portion 12a communicates with the exhaust conduit 10 (directly or for instance via a muffler) and with the valve 13, whereas the portion 12b also communicates with the valve 13 and in addition with an upstream portion 14a of the air intake conduit 14 of the engine. In other words, the air intake conduit 14 supplies combustion air to the engine and is subdivided by the conventional throttle 18 which controls the flow of air through the conduit 14, into the portion 14a which is located upstream of the throttle 18 and the portion 14b which is located downstream of the throttle 18. The terms upstream and downstream refer, of course, to the flow direction of the incoming combustion air.

The magnetic valve 13 permits the recirculation of a portion of the exhaust gases from the exhaust conduit 10 into the intake conduit 14 only under certain operational conditions of the engine, for instance when the engine operates only partly under load. Electrical conductors 15 connect the valve 13 with a diagrammatically illustrated control unit 16 which is known per se and whose construction and operation do not form a part of the present invention. It will suffice to point out that the unit 16 produces control signals which may be dependent upon variable operating parameters, such as engine rpm, underpressure existing in the intake conduit 14 and/or position of the throttle 18. The valve 13 is operated in dependence upon the thus produced signals. Parenthetically it is pointed out that although the valve 13 has been illustrated as separated from the combustion engine 11, and has been shown on a scale which is considerably larger than its actual size-relationship with the combustion engine, in actual practice the valve 13 would normally be directly connected to the combustion engine (for instance by means of an appropriate flange) and would be smaller than illustrated in relationship to the engine.

A filter 17 has been illustrated in phantom lines, and the construction of such filters is well-known to those skilled in the art. Such a filter 17 may be interposed in the conduit portion 12a in order to remove the coarser contaminants from the exhaust gases and to prevent them from entering into the valve 13 where they might interfere with proper operation.

There is further provided a supplementary-air conduit 19 which communicates with the valve 13 as well as with the downstream portion 14b of the intake conduit 14.

Figure 2:
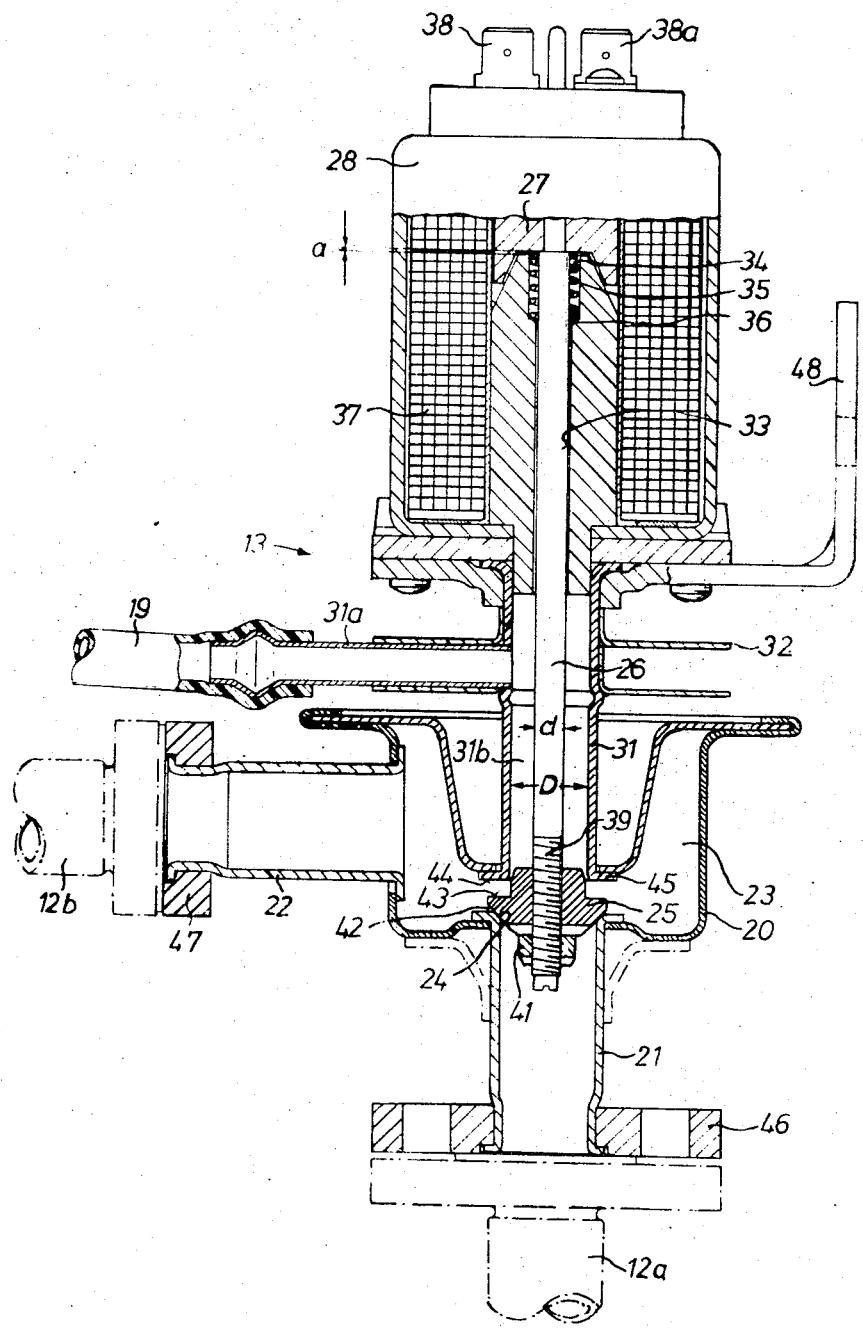
FIG. 2 is a sectional elevational view, showing a detail of the arrangement in FIG. 1.

FIG. 2 shows details of the arrangement on an enlarged scale. Reference numeral 20 in FIG. 2 identifies a valve housing of the valve 13. The housing 20 is provided with an inlet 21 and an outlet 22 which in the illustrated embodiment is located at a right angle with reference to the inlet 21. The inlet and outlet both communicate with this valve chamber 23, and also in communication with this valve chamber is a thin-walled sleeve-shaped tubular element 31.

A valve seat 24 surrounds the opening of the inlet 21 and axially spaced from the valve seat 24 there is provided an additional valve seat 44 formed on a radial flange 45 of the tubular element 31, which flange serves to connect the element 31 with the valve housing 20 and, as illustrated, surrounds the open end of the tubular element 31. A valve member 25 is secured on a valve rod 26 and is movable between a position (illustrated in FIG. 2) in which it sealingly engages the valve seat 24 and another position in which it is spaced from the valve seat 24 but sealingly engages the valve seat 44. The engagement of the valve member with the valve seat 24 is via a sealing face 42 which here is of conical configuration, and the engagement with the valve seat 44 is via a sealing face 43 which here is of flat configuration.

Also connected with the tubular element 31, which acts as a spacer element, is an electro-magnetic device 28. The device 28 has the usual winding 37 and a reciprocable armature 27. The inner diameter D of the spacing element 31 should be substantially larger than (preferably a multiple of) the outer diameter d of the rod 26 in order to provide a relatively large annular clearance 31b between them. The purpose of this measure is to assure that particulate contaminants carried along by the recirculated portion of the combustion gases and which might get past the valve member 25 and enter the clearance 31b, be incapable of interferring with the free reciprocatory movement of the rod 26.

As already indicated, the tubular element 31 acts as a spacing element, the purpose being to prevent a transmission of the thermal energy of the recirculated portion of the combustion gases to the electromagnetic device 28 as much as possible. This is facilitated by making the tubular element 31 in accordance with a preferred concept of the invention of a material having a low coefficient of thermal conductivity, advantageously a highly alloyed chromium nickel steel, a material which has the requisite characteristic and in addition is also strongly resistant to corrosion. It is further advantageous to provide cooling ribs or fins 32 of thin sheet material (here, however, of a material having good thermal conductivity) on the tubular element 31 in order to further reduce the transmission of heat to the electromagnetic device 28.

The supplementary air conduit 19, which also consititutes a fluid flow passage as do the portions 12a and 12b of the conduit 12, is connected with the clearance 31b in the tubular element 31 via a nipple 31a. Thus, the interior clearance 31b is in communication with the interior of the intake conduit portion 14b.

The device 28 is provided with a guide passage 33 in which the rod 26 is guided, and the passage 33 has an enlarged portion 34 which accommodates a restoring spring 35 which bears against a shoulder 36 of the enlarged portion 34 and also upon the armature 27. Reference numerals 38 and 38a designate terminals which are connected with the winding 37 as well as with the conductors 15 (see FIG. 1) leading to the unit 16.

In the position of the valve member 25 which is illustrated in FIG. 2, the valve member 25 prevents any passage of exhaust gases from the exhaust conduit 10 into the valve housing 20. The valve member 25 assumes this position when the electromagnetic device 28 is energized, that is when the armature 27 is displaced against the opposing force of the restoring spring 35. The air gap $a$ necessary in the energized condition of the electro-magnetic device 28 can be adjusted by means of screw threads 39 onto which the valve member 25 and a counter nut 41 are threaded.

In its other end position, to which it is urged when the device 28 is de-energized and the armature 27 is restored by the action of the spring 35, the sealing face 43 sealingly abuts the valve seat 44, thereby sealing the interior of the tubular element 31 and preventing entry of exhaust gases from the portion 12a into the tubular element 31 and from there into the device 28.

A flange 46 connects the housing 20, or more particularly the inlet nipple 21 thereof, with the diagrammatically illustrated cooperating flange of the conduit portion 12a; a similar flange 47 provides the same connection with the conduit portion 12b. In the illustrated embodiment there is provided an angle flange 48 by means of which the valve 13 may be mounted on the combustion engine 11.

When the valve 13 is in the position illustrated in FIG. 2, it establishes a communcation between the interior of the conduit portion 12b and the supplementary air conduit 19, thus providing an air bypass about the throttle 18 in the intake conduit 14. When the throttle 18 is closed and the valve 13 in the position of FIG. 2, the engine can be supplied with the supplementary air which is necessary during idling of the engine for warm-up purposes, in order to increase the idle speed sufficiently. In this position of the valve 13, supplementary air can also be supplied in the just-described manner during shifting of gears and when the engine moves to an operative condition in which it is being pushed by the vehicle, that is in which it is being turned over due to its operative connection with the wheels of the vehicle. In either case, a reduction of the disadvantageous hydrocarbon emissions is obtained.

To assure smooth idling, a recirculation of portions of the exhaust gases should not take place during idling of the engine. Because the portion 12b communicates with the portion 14a upstream of the throttle 18, with the latter being closed during idling and with little exhaust gas pressure being exerted in this operative position from the exhaust gas in the conduit 10, the valve may be maintained in its open position (the position which is not illustrated in FIG. 2) when the engine is warm and does not require supplementary air.

It has already been pointed out before that the rather large annular clearance between the inside of the tubular element 31 and the outside of the rod 26 prevents interference of particulate contaminants which might enter this clearance, with the free movement of the rod 26. A further safeguard in this respect is the fact that the supplementary air conduit 19 communicates with the clearance 31b because the flow of air which takes place from the portion 12b through the clearance 31b and into the conduit 19 when the valve member 25 is in the position shown in FIG. 2, serves to flush contaminants out of the clearance 31b and of course also out of the valve chamber 23.

It will be understood that each of the elements described above, or two or more together, may also find a useful application in other types of constructions differing from the types described above.

While the invention has been illustrated and described as embodied in a combustion engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

1. In a combustion engine, in combination, an intake conduit for a stream of combustion air; throttle means interposed in said intake conduit for regulating the flow of combustion air therethrough; an exhaust conduit for exhausting combustion gases from the engine; first passage means communicating with said intake conduit downstream of said throttle means; second passage means communicating with said intake conduit upstream of said throttle means; third passage means communicating with said exhaust conduit; valve means comprising a housing having a chamber provided with a first and second opening which communicate with said second and third passage means, respectfully, a tubular element extending from said housing and having an open end which communicates with said chamber and an interior in communication with said first passage means, a first and a second valve seat respectively surrounding said open end and said second opening, a valve member movable in said chamber between a first position in which it engages said first valve seat, preventing communication between said chamber and said interior and permitting communication between said second and said third passage means, and a second position in which it engages said second valve seat, preventing communication between said chamber and said third passage means and permitting communication between said first and said second passage means, an operating member connected with said valve member and extending axially through said tubular element; and actuating means for moving said operating member in a tense effecting movement of said valve member between said first and second positions thereof.

2. In a combustion engine as defined in claim 1, wherein said actuating means is an electromagnet.

3. In a combustion engine as defined in claim 1, wherein said operating member is a rod and said actuating means is an electromagnet connected with said tubular element spaced from said housing and having a reciprocable component connected with said rod for axially shifting the same and thereby moving said valve member between said first and second positions thereof.

4. In a combustion engine as defined in claim 3, wherein said tubular element is at least in part composed of material having a low coefficient of thermal conductivity.

5. In a combustion engine as defined in claim 3, said rod having an outer diameter, and said tubular element having an inner diameter which is a multiple of said outer diameter.

6. In a combustion engine as defined in claim 3, said rod defining with an inner circumferential surface of said tubular element an annular clearance.

7. In a combustion engine as defined in claim 3; and further comprising cooling ribs provided on said tubular element.

8. In a combustion engine as defined in claim 3, said housing having an aperture communicating with said chamber, and said tubular element having an endportion extending into said aperture and having said open end.

9. In a combustion engine as defined in claim 8, wherein said endportion of said tubular element is provided with an endface bounding said open end and constituting said first valve seat.

10. In a combustion engine as defined in claim 9, said end portion of said tubular element having a radial flange located within said chamber and provided with said endface.

* * * * *